(12) United States Patent
Martin

(10) Patent No.: US 12,546,149 B2
(45) Date of Patent: Feb. 10, 2026

(54) DOOR UNIT FOR A VEHICLE

(71) Applicant: Airbus Operations GmbH, Hamburg (DE)

(72) Inventor: Alexander Martin, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 783 days.

(21) Appl. No.: 17/824,181

(22) Filed: May 25, 2022

(65) Prior Publication Data
US 2022/0381069 A1    Dec. 1, 2022

(30) Foreign Application Priority Data
Jun. 1, 2021 (EP) .................................. 21177111

(51) Int. Cl.
| | |
|---|---|
| *E05B 83/42* | (2014.01) |
| *B64C 1/14* | (2006.01) |
| *E05B 77/24* | (2014.01) |
| *E05B 81/04* | (2014.01) |

(52) U.S. Cl.
CPC ............ *E05B 83/42* (2013.01); *B64C 1/1423* (2013.01); *B64C 1/143* (2013.01); *E05B 77/245* (2013.01); *E05B 81/04* (2013.01)

(58) Field of Classification Search
CPC ....... B64C 1/14; B64C 1/1407; B64C 1/1415; B64C 1/1423; B64C 1/143
See application file for complete search history.

(56) References Cited

U.S. PATENT DOCUMENTS

| | | | |
|---|---|---|---|
| 2,748,855 A | | 6/1956 | Siems et al. |
| 3,647,169 A | * | 3/1972 | Allwright ............. B64C 1/1407 244/129.5 |
| 4,497,462 A | * | 2/1985 | Hamatani ............. B64C 1/1415 244/129.5 |
| 5,337,977 A | * | 8/1994 | Fleming .................. B64C 1/143 D12/345 |

(Continued)

FOREIGN PATENT DOCUMENTS

| | | |
|---|---|---|
| DE | 102019112336 A1 | 11/2020 |
| EP | 1780119 A2 | 5/2007 |

OTHER PUBLICATIONS

German Search Report; priority document.

*Primary Examiner* — Joshua J Michener
*Assistant Examiner* — Cindi M Curry
(74) *Attorney, Agent, or Firm* — Greer, Burns & Crain, Ltd.

(57) ABSTRACT

A door unit for an aircraft includes a door which is configured, in a closed position, to cover an opening in the vehicle and to delimit a vehicle interior from a vehicle environment; a pressure compensation flap which is configured, in a sealing position, to cover a pressure compensation opening in the door and, in a pressure compensation position, to at least partially release the pressure compensation opening; a locking element which is configured, in a locking state, to lock the door in the closed position and, in an unlocking state, to unlock the door; and a blocking element which is configured, in the sealing position of the pressure compensation flap, to block a movement of the locking element from the locking state into the unlocking state, wherein the blocking element is arranged on the pressure compensation flap.

20 Claims, 12 Drawing Sheets

(56) References Cited

U.S. PATENT DOCUMENTS

| | | | | |
|---|---|---|---|---|
| 5,931,415 | A * | 8/1999 | Lingard | B64C 1/143 |
| | | | | 74/105 |
| 7,900,870 | B2 * | 3/2011 | Kyle | B64C 1/1407 |
| | | | | 244/129.4 |
| 7,938,366 | B2 | 5/2011 | Martinez Rueda et al. | |
| 8,226,037 | B2 * | 7/2012 | Obst | B64C 1/1407 |
| | | | | 244/129.5 |
| 10,494,077 | B2 * | 12/2019 | Schneider | B64C 1/18 |
| 2009/0108133 | A1 * | 4/2009 | Clausen | B64C 1/1407 |
| | | | | 244/129.1 |
| 2010/0294887 | A1 * | 11/2010 | Depeige | B64C 1/1407 |
| | | | | 244/129.5 |
| 2018/0127100 | A1 * | 5/2018 | Roth | B64D 13/04 |
| 2020/0224462 | A1 | 7/2020 | Renner et al. | |
| 2022/0135201 | A1 * | 5/2022 | Mortland | B64C 1/1423 |
| | | | | 244/129.5 |

\* cited by examiner

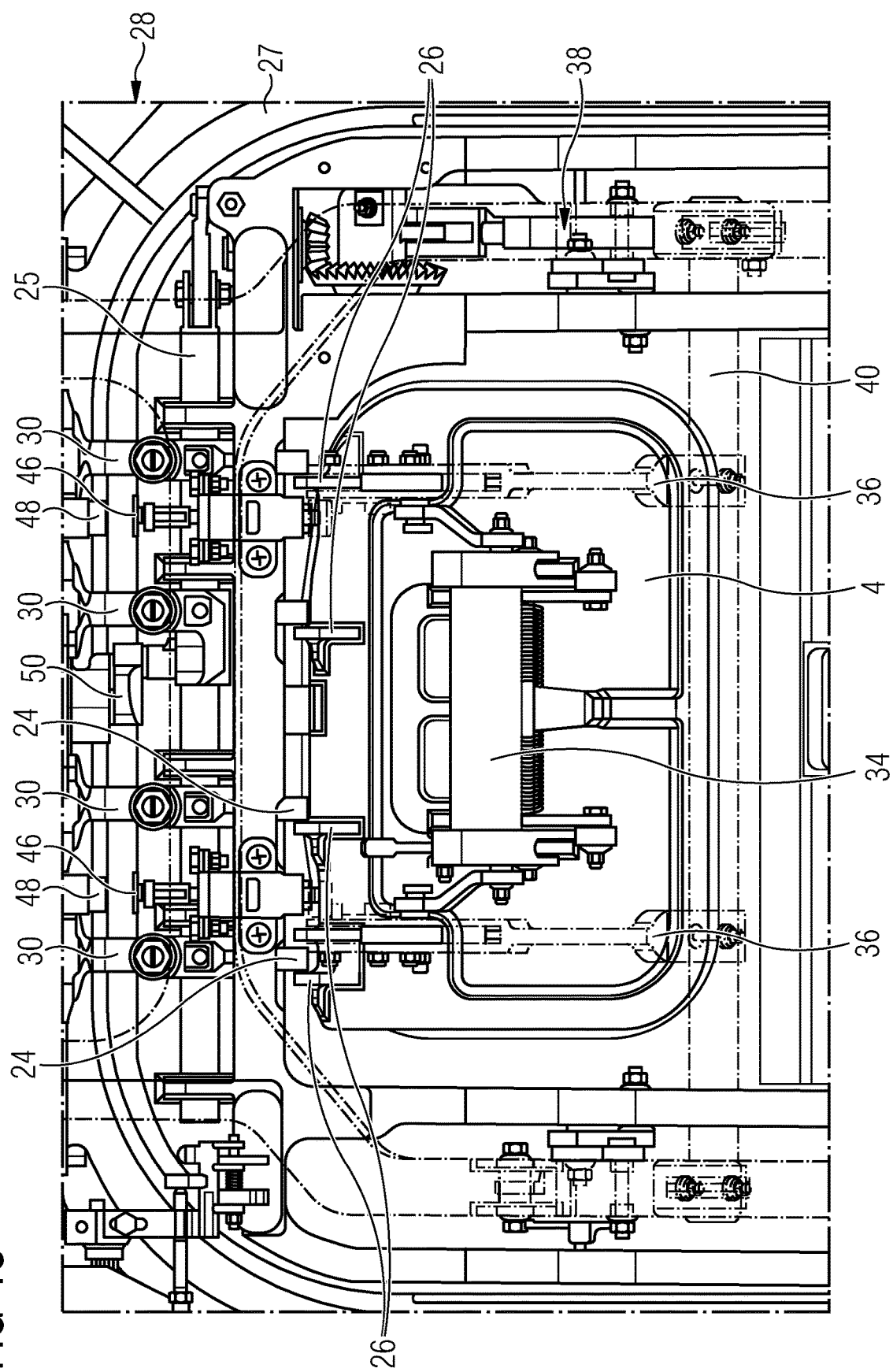

DOOR UNIT FOR A VEHICLE

CROSS-REFERENCES TO RELATED APPLICATIONS

This application claims the benefit of the European patent application No. 21177111.8 filed on Jun. 1, 2021, the entire disclosures of which are incorporated herein by way of reference.

FIELD OF THE INVENTION

The invention relates to a door unit, a door system and a vehicle having such a door unit or such a door system. In particular, the invention relates to a door unit for an emergency exit door of an aircraft.

BACKGROUND OF THE INVENTION

Vehicle doors are used, in a closed position, to cover and close an opening in a vehicle and to seal a vehicle interior with respect to the vehicle environment. Vehicle doors can be mounted on a door frame by means of door hinges. Such a door frame may be part of the vehicle fuselage or be integrated therein. In order, during assembly, to facilitate an adjustment of the vehicle door with respect to the door frame, the door hinge may comprise an adjustable rotary joint between the vehicle door and the door frame. For example, such an adjustable rotary joint comprises an eccentric bolt having two radially offset portions, of which a first is connected to the door and a second is connected to the door frame. By rotating the bolt, an adjustment of the vehicle door with respect to the door frame in a first direction can be carried out. Axial spacing washers can be pushed onto the bolt in order to carry out an adjustment of the vehicle door with respect to the door frame in a second direction. The rotation of the bolt and the number and/or size of the spacing washers may in some circumstances already be adjusted prior to the assembly of the door, for example, in the knowledge of a deformation of the vehicle fuselage at the time of the door assembly.

In specific vehicle types, safety standards have to be complied with. For example, for aircraft doors it is necessary for them to securely close the aircraft interior both on the ground and in flight. In this instance, the door must also be securely closed during a pressure difference applied between the aircraft interior and the aircraft environment. On the other hand, the doors must be able to be opened easily and rapidly in the event of an emergency. Emergency exit doors which are provided not for the normal entry and exit of persons, but instead are opened only in the event of an emergency represent another specific feature in this instance. Such doors are, for example, opened by cabin crew members or passengers in the event of an emergency.

In order to prevent, after an incomplete or incorrect closure of a door, a pressure difference being built up between the interior of the aircraft and the outer space or the aircraft environment, a pressure build-up prevention flap or "pressure prevent means" or "vent flap" is generally provided in the door. The pressure build-up prevention flap is arranged in such a manner that it can cover or release a free flow area in the door. The pressure build-up prevention flap can be configured to completely seal or cover the free flow area only when the door is completely and correctly closed and/or locked.

When the door is opened during application of a pressure difference, a pressure compensation can at least partially be carried out by means of the pressure build-up prevention flap. The term "pressure build-up prevention flap" is therefore in this instance used synonymously with the term "pressure compensation flap" and the "free flow area" is also referred to as a "pressure compensation opening".

In order to prevent undesirable opening of a door, for example, during flight operation, locking mechanisms are generally used. In known vehicle doors, these locking mechanisms are constructed in a complex manner and are relatively heavy. Furthermore, known vehicle doors provide for electrical components which are arranged in the movable door, which makes electrical contacting difficult and complicates the production of the door. All this results in a high weight and high production costs of known vehicle doors.

SUMMARY OF THE INVENTION

An object of the invention is to provide a vehicle door which in spite of low weight can be produced and installed in a cost-effective manner.

According to a first aspect, a door unit for a vehicle is provided. The door unit comprises a door which is configured, in a closed position, to cover an opening in the vehicle and to delimit a vehicle interior from a vehicle environment, a pressure compensation flap which is configured, in a sealing position, to cover a pressure compensation opening in the door and, in a pressure compensation position, to at least partially release the pressure compensation opening, and a locking element which is configured, in a locking state, to lock the door in the closed position and, in an unlocking state, to unlock the door. The door unit further comprises a blocking element which is configured, in the sealing position of the pressure compensation flap, to block a movement of the locking element from the locking state into the unlocking state, wherein the blocking element is arranged on the pressure compensation flap.

For example, the vehicle is an airplane, in particular an aircraft. The door may be an emergency exit door, in particular an emergency exit door which is arranged in the region of the wings of the aircraft. For example, an upper door region is configured to be arranged in the region of a door lintel, while a lower door region is configured to be arranged in the region of a door threshold. The door may be configured to pivot open in an upward direction. The door may be a wing door which opens in an upward direction. The pressure compensation opening may be introduced in the upper region of the door. The blocking element is, for example, arranged in the upper door region. The locking element may be arranged in the upper door region.

The blocking element may be arranged so as to be rotationally secure and/or translationally secure relative to the pressure compensation flap. The blocking element may be secured to the pressure compensation flap. The blocking element may be produced integrally with the pressure compensation flap or a carrier element of the pressure compensation flap. The blocking element may also be produced as a separate component from the pressure compensation flap and secured to the pressure compensation flap, for example, by means of a screw connection.

For example, the blocking element is configured, in the sealing position of the pressure compensation flap, to block the movement of the locking element from the locking state into the unlocking state by means of direct contact with the locking element. For example, the blocking element is configured, in the sealing position of the pressure compensation flap, to block a translation of the locking element from the locking state into the unlocking state. The blocking element may be configured, in the sealing position of the pressure compensation flap, to block the translation of the locking element in a direction which extends substantially parallel with the pressure compensation flap. This direction may extend parallel with an axis about which at least a portion of the pressure compensation flap rotates when the pressure compensation flap is moved from the sealing position into the pressure compensation position and/or from the pressure compensation position into an open position.

The blocking element may extend in the direction of the vehicle interior with respect to the pressure compensation flap. The blocking element may protrude from the pressure compensation flap in the direction of the vehicle interior. For example, the blocking element protrudes at least partially over an outer edge of the pressure compensation flap.

The blocking element may be configured, in the pressure compensation position of the pressure compensation flap, to permit the movement of the locking element from the locking state into the unlocking state. For example, the blocking element is configured in such a manner that, in the pressure compensation position of the pressure compensation flap, it is spaced apart from the locking element in the direction of the vehicle interior and/or in the direction of the door center.

The pressure compensation flap may be configured to at least partially release the pressure compensation opening by means of a spacing in the direction of the vehicle interior. The door unit may be configured in such a manner that the pressure compensation flap can be displaced by means of a substantially translational movement of the pressure compensation flap in the direction of the vehicle interior from the sealing position into the pressure compensation position. The pressure compensation flap is located in this instance in the pressure compensation position further in the vehicle interior than in the sealing position.

The door unit may further comprise an actuation mechanism which is configured, during a movement of the pressure compensation flap from the pressure compensation position into an open position, to move the locking element from the locking state into the unlocking state. The actuation mechanism may be connected to a handle and/or to the pressure compensation flap (for example, directly or with contact). The actuation mechanism and/or the handle may be connected to the pressure compensation flap (for example, directly or with contact).

For example, the door unit comprises a door state indication element which is arranged in such a manner that, during a movement of the pressure compensation flap from the sealing position into the pressure compensation position, it moves in the direction of the door center. The door state indication element is, for example, arranged in the upper door region. The door state indication element is, for example, a purely mechanical component. The door state indication element may be coupled to the actuation mechanism, the pressure compensation flap and/or the handle.

For example, the door comprises only mechanical components. In other words, the door comprises, in one example, no electrical cable-bound components and/or no electrical components.

According to a second aspect, a door system is provided. The door system comprises the door unit according to the first aspect, a door frame having a door lintel and a door threshold, and a locking counter-piece which is arranged in the region of the door lintel and which is configured, in the closed position of the door in the locking state of the locking element, to cooperate with the locking element in order to lock the door. The door frame may be part of a vehicle fuselage, may be able be installed in the vehicle fuselage or be installed in the vehicle fuselage.

The door system may further comprise a spacing sensor which is arranged on the door frame and which is in particular electrically operated and which is configured to measure a spacing between the spacing sensor and the door state indication element.

For example, the door system further comprises an electrically operated safety actuator which is arranged on the door frame and which is configured, in an activated state, to block a movement of the locking element from the locking state into the unlocking state and, in a deactivated state, to release the movement of the locking element from the locking state into the unlocking state. The electrically operated safety actuator can, for example, contact the locking element in order to block the locking element.

According to a third aspect, there is provided a vehicle which comprises the door unit according to the first aspect or the door system according to the second aspect. The vehicle may be an airplane, in particular an aircraft. For example, the door unit or the door system is arranged in the region of (for example, in particular above) a wing of the aircraft.

BRIEF DESCRIPTION OF THE DRAWINGS

Preferred embodiments of the invention will now be explained with reference to the appended schematic drawings, in which FIG. 4*a*-4*c* show the cut-out of the door system in a second state.

The same reference numerals refer to the same functional or structural features below.

DETAILED DESCRIPTION OF THE PREFERRED EMBODIMENTS

Figure 1:
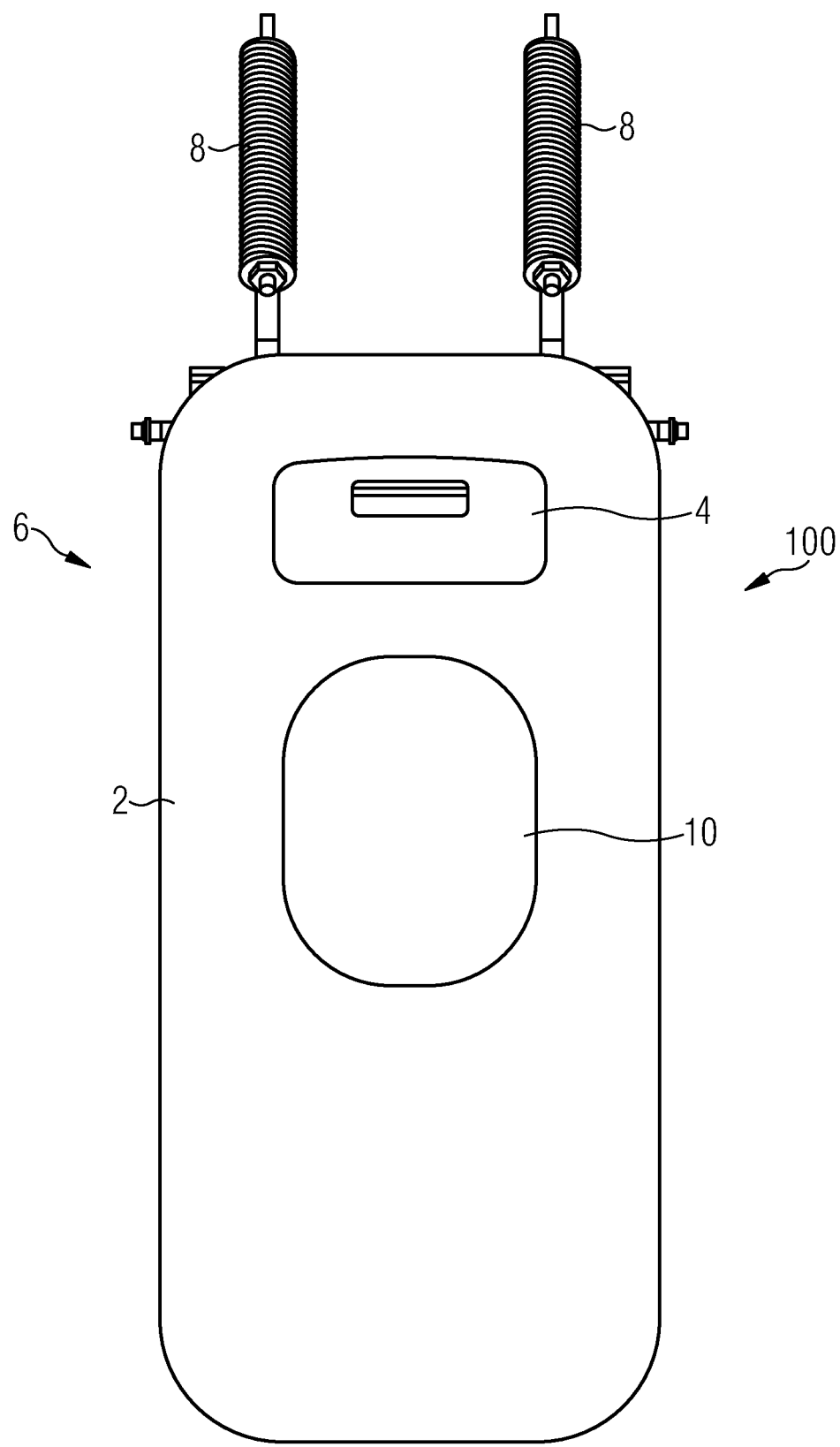
FIG. 1 shows a schematic external view of a door unit.

FIG. 1 is a schematic external view of a door unit 100 for a vehicle. The door unit 100 comprises a door 2 and a pressure compensation flap 4 which is arranged in an upper door region 6. Furthermore, there is illustrated an optional opening mechanism 8 which is connected to the door unit and which is used to open the door 2 from a closed position, in which the door 2 closes an opening in the vehicle, in an upward direction. The door 2 also optionally comprises a window 10.

Figure 2:
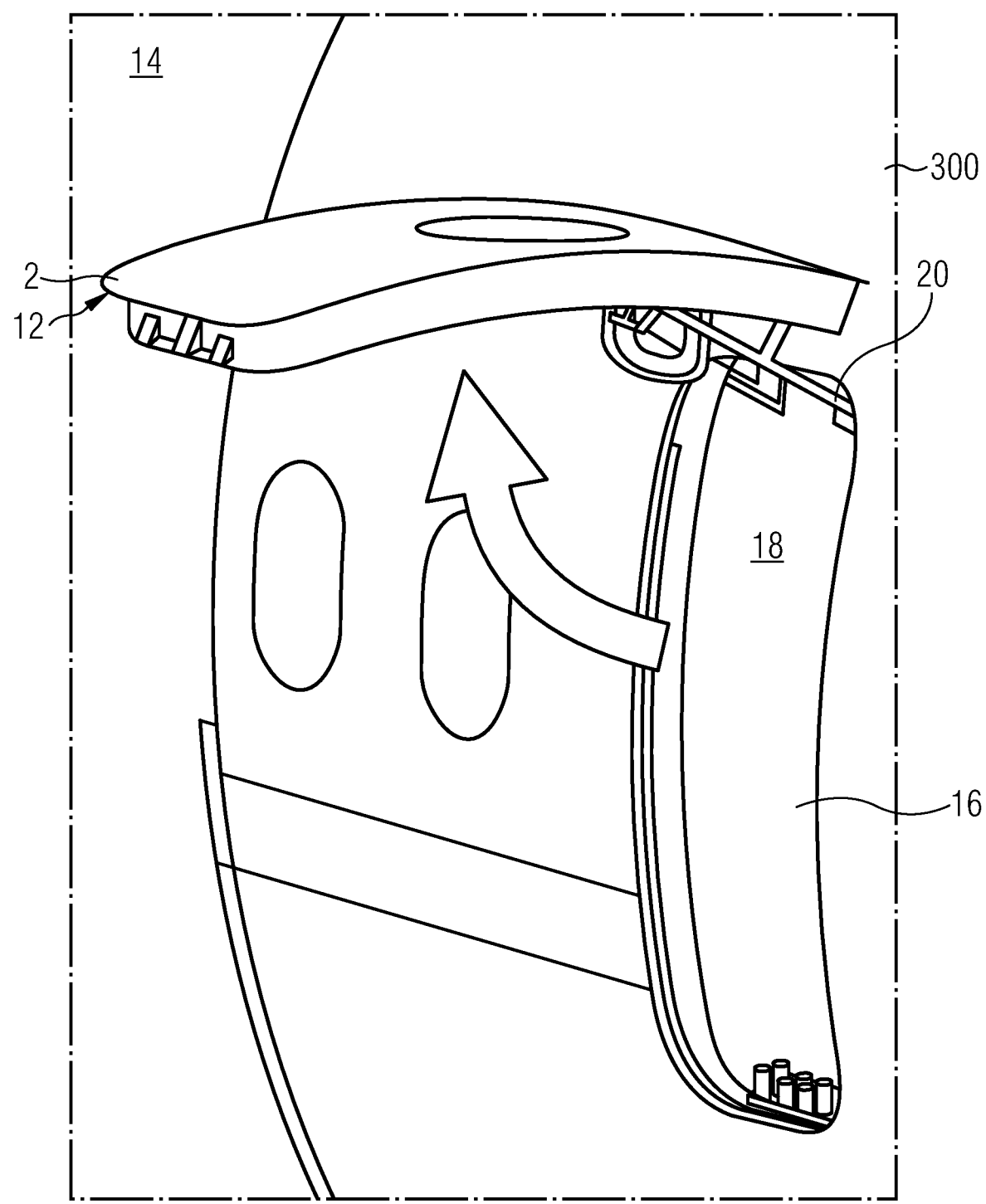
FIG. 2 shows a movement sequence when the door of the door unit or a door system is opened.

An exemplary opening movement of the door 2 is schematically illustrated in FIG. 2. The entire door 2 is in this instance folded open in an upward direction in accordance with the operating method of a wing door. The lower edge 12 of the door 2 moves in this instance on a circular path in the direction of the vehicle environment 14 and in an upward direction. A lower portion of the door 2 is located in this instance a greater distance further back than the upper portion 6 of the door 2. In order to move the door in this manner, an articulation mechanism 20 may be provided.

Prior to the opening of the door 2, the door 2 covers the opening 16 and delimits a vehicle interior 18 from the vehicle environment 14. In the open state, the door no longer covers the opening 16 in the vehicle 300. Passengers can thus leave the vehicle 300 through the opening 16 after the door 2 has been opened.

Figure 3A:
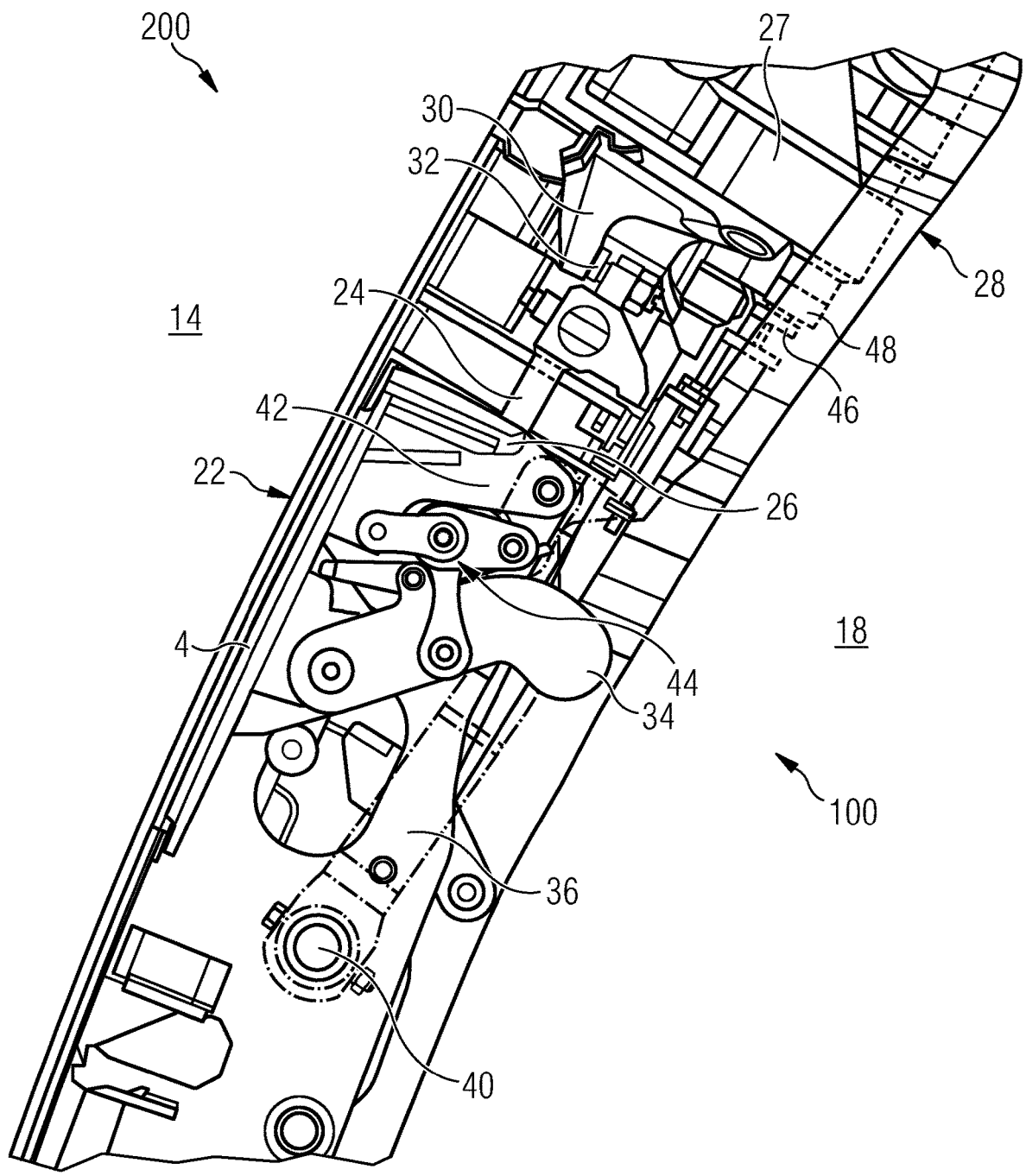
FIG. 3*a*-3*c* show a cut-out of the door system in a first state.
Figure 3B:
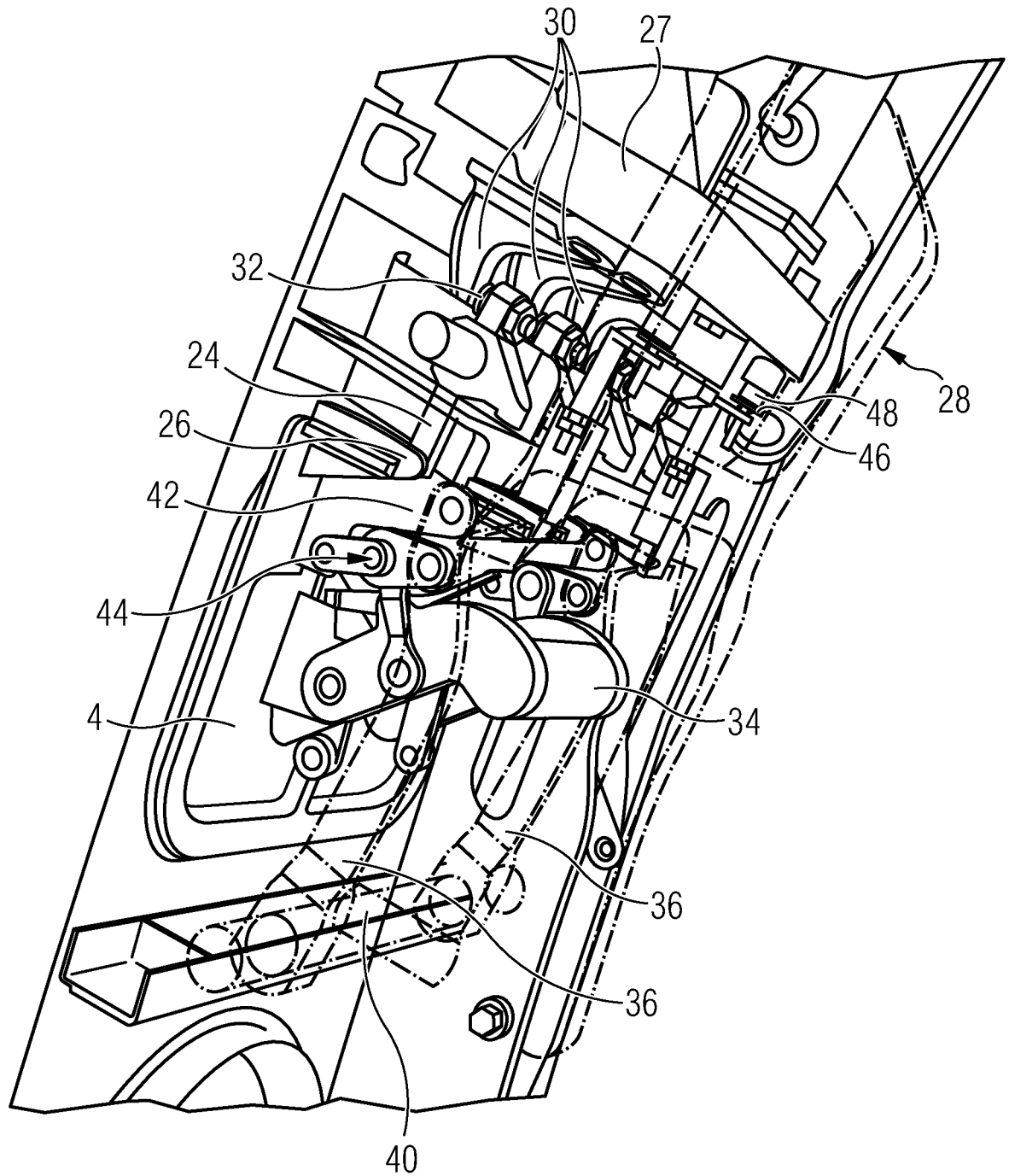
Figure 3C:
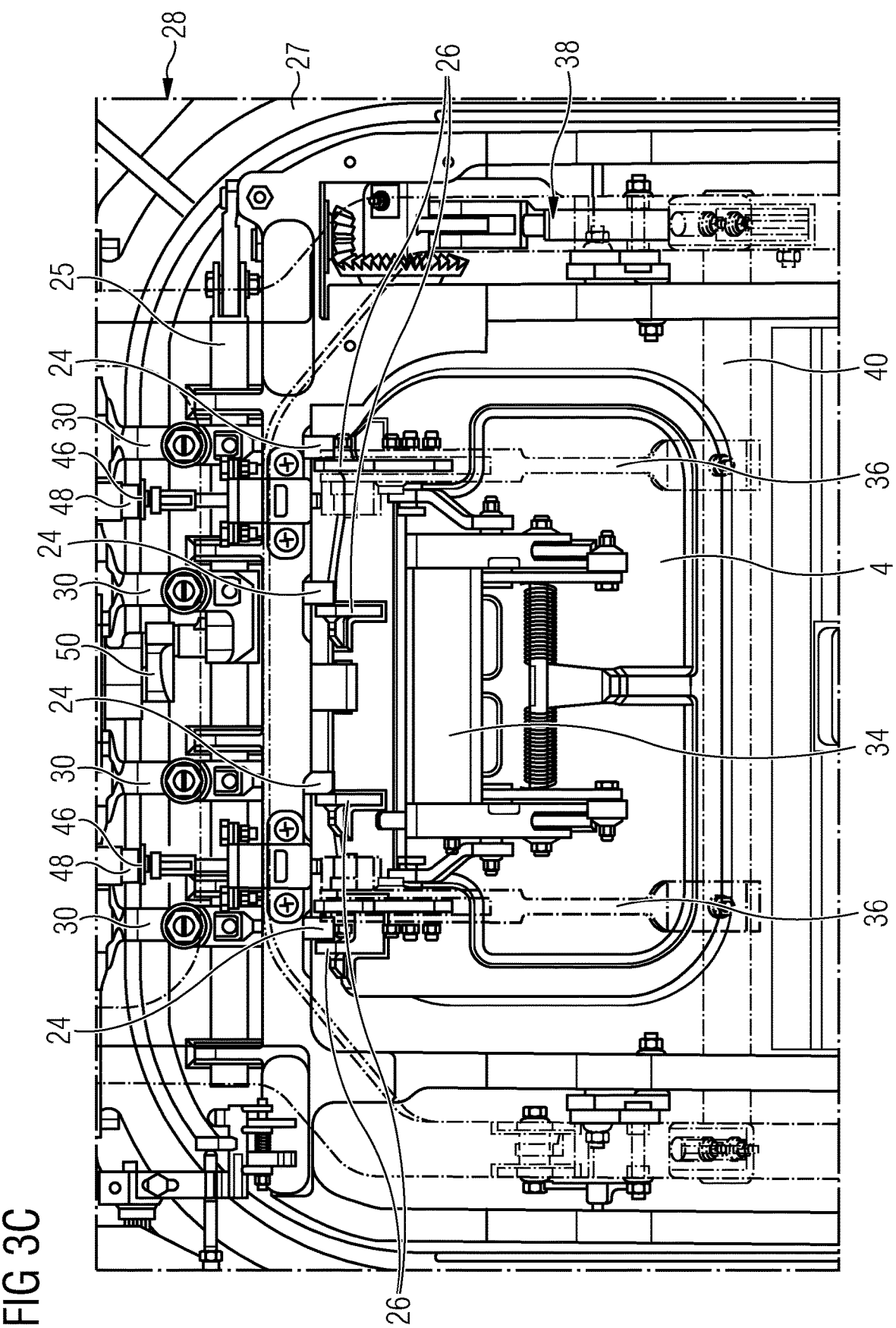

FIGS. 3a-3c show a cut-out of a door system 200 in a first state. The door system 200 comprises the door unit 100. In the first state of the door system 200, the pressure compensation flap 4 is in a sealing position. In this sealing position, the pressure compensation flap 4 covers a pressure compensation opening 22 in the door 2. The pressure compensation opening 22 in the door 2 is thus closed in a pressure-tight manner.

In the first state of the door system 200, the door 2 is closed and locked. The door unit 100 comprises, to this end, a locking element 24. The locking element 24 is located in FIGS. 3a to 3c in a locking state in which it locks the door 2 in the closed position. The door system 200 comprises a door frame 27 having a door lintel 28 and a door threshold 29, wherein a locking counter-piece 30 is arranged in the region of the door lintel 28. The locking counter-piece 30 cooperates in the first state of the door system 200 with the locking element 24 in order to lock the door 2. The locking element 24 cooperates with an end facing away from the pressure compensation flap 4 with the locking counter-piece 30. The locking element may be in contact with the locking counter-piece 30 by means of an adjustment element 32 which is screwed into the locking element 24. The locking counter-piece 30 locks the door 2 in that it blocks a movement of the locking element 24 in the direction toward the vehicle environment 14. Thus, the door cannot be opened in an outward direction as shown in FIG. 2. In order to unlock the door 2, the locking element 24 has to be displaced in the door plane with respect to the locking counter-piece 30 which is non-movable relative to the door frame 27 (in FIG. 3c to the left or right).

The door unit 100 comprises a blocking element 26. This serves to prevent unintentional displacement of the locking element 24. The blocking element 26 is arranged in an upper region of the pressure compensation flap 4. In the embodiment shown, the blocking element 26 is produced integrally with the pressure compensation flap 4 and protrudes from the pressure compensation flap 4 in the direction of the vehicle interior 18. A portion of the blocking element 26 protrudes over an upper portion of an outer edge 4a of the pressure compensation flap 4. The blocking element 26 prevents in the first state of the door system 200 the displacement or translation of the locking element 24 in a direction which extends parallel with the upper portion of the outer edge 4a of the pressure compensation flap 4 (in FIG. 3c toward the left). It may thus be said that the blocking element 26 is configured, in the sealing position of the pressure compensation flap, to block a movement of the locking element 24 from the locking state into an unlocking state, wherein the locking element 24 unlocks the door in the unlocking state. In other words, the locking element 24 can unlock the door only when the blocking element 26 permits the movement of the locking element 24 from the locking state into the unlocking state.

Of course, a large number of blocking elements 26 and locking elements 24 may be provided. The locking elements 24 can be arranged so as to be non-movable relative to each other. For example, the locking elements 24 are secured to the same shaft 25. As can be seen in FIG. 3c, in the first state of the door system 200, a movement of the locking elements 24 to the left is blocked by the blocking elements 26.

Figure 4A:
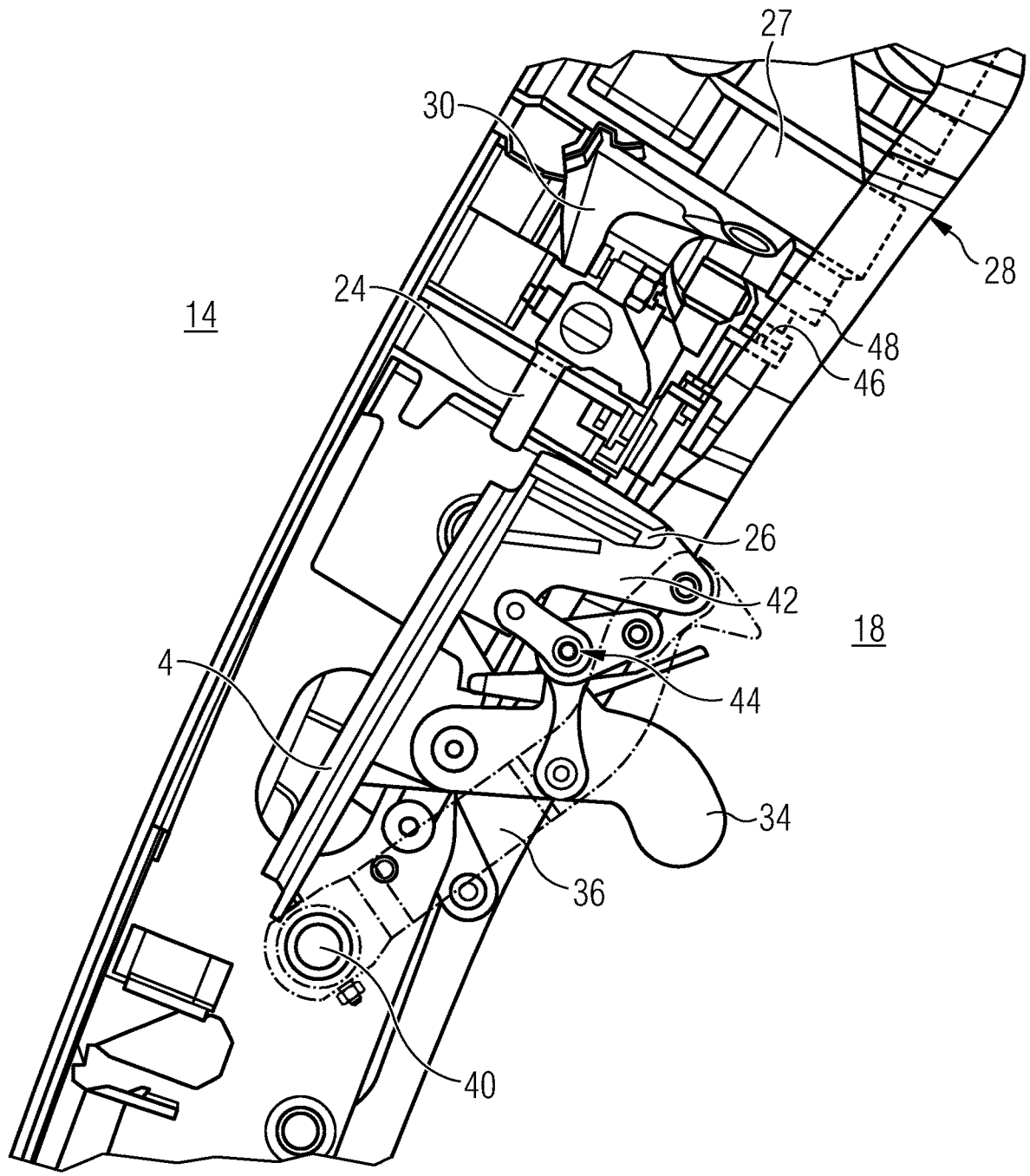
Figure 4B:
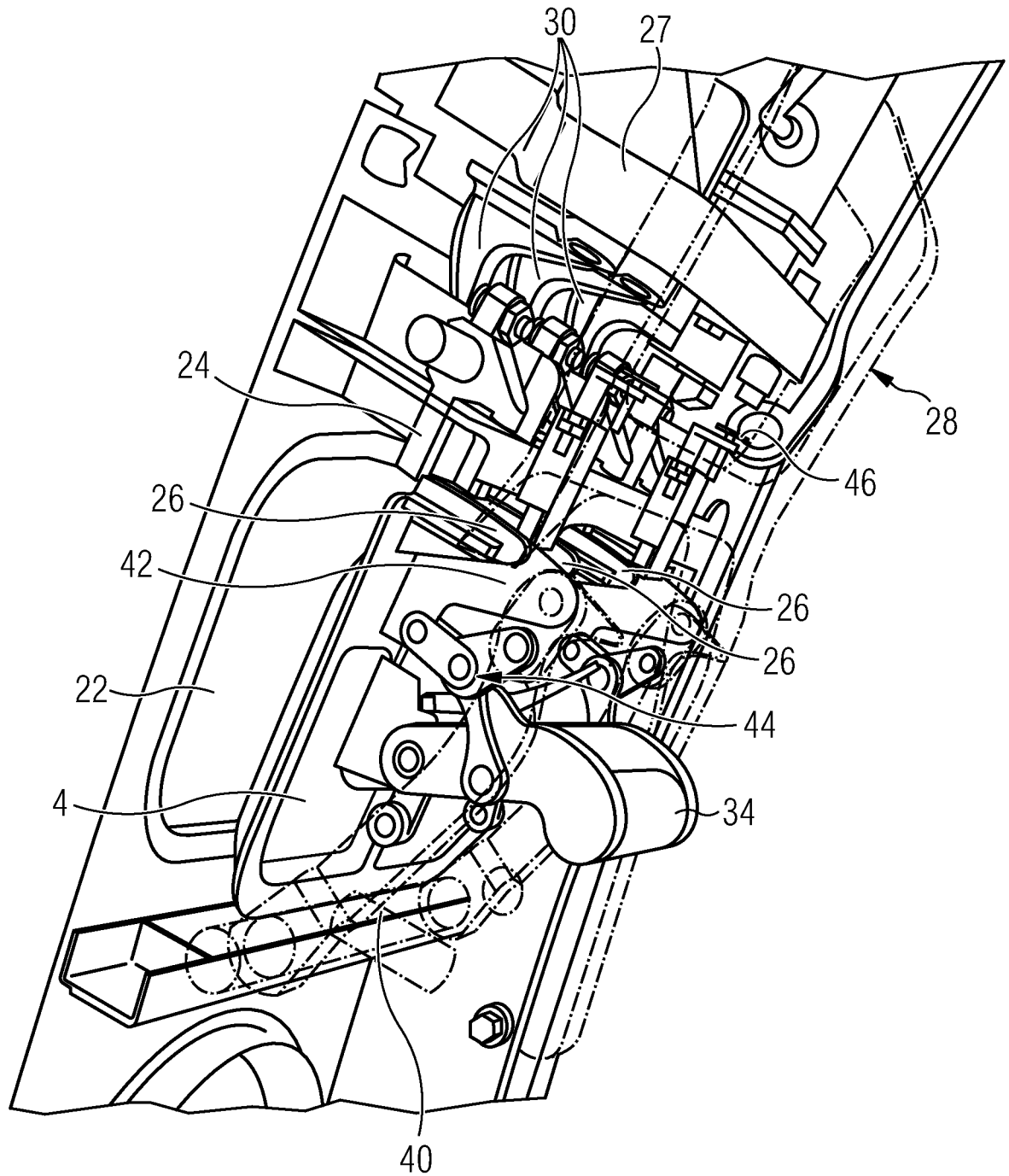

FIGS. 4a-4c show the cut-out of the door system 200 in a second state. In the second state of the door system 200, the pressure compensation flap 4 is in a pressure compensation position. In this pressure compensation position, the pressure compensation flap 4 at least partially releases the pressure compensation opening 22 since it was moved in the direction of the vehicle interior 18. The pressure compensation flap 4 is thus spaced apart in the pressure compensation position from the pressure compensation opening 22 in the direction of the vehicle interior 18. Consequently, a pressure compensation between the vehicle environment 14 and the vehicle interior 18 is enabled via the pressure compensation opening 22. In order to manually move the pressure compensation flap 4, there is provided in the door unit 100 a handle 34 which is secured to the pressure compensation flap 4. The pressure compensation flap 4 is connected to the door 2 by means of at least one arm 36 of the door unit 100. In the example shown, two arms 36 which are spaced apart in a width direction of the door 2 are provided for this purpose.

In the second state of the door system 200, the door 2 is further closed and locked. This is a result of the fact that the locking element 24 also further cooperates with the locking counter-piece 30 in the second state, as can be seen, in particular, in FIG. 4c. The locking element 24 is thus also in the locking state in this instance. However, the blocking element 26 in the pressure compensation position of the pressure compensation flap 4 allows the locking element 24 to be laterally displaced. In other words, the blocking element 26 in the second state of the door system 200 permits a movement of the locking element 24 from the locking state into the unlocking state. This can be seen, in particular, in FIG. 4a, according to which the blocking element 26 in the pressure compensation position of the pressure compensation flap 4 is spaced apart from the locking element 24 in the direction of the vehicle interior 18. The locking element 24 can consequently be displaced to the left in FIG. 4c.

Figure 5A:
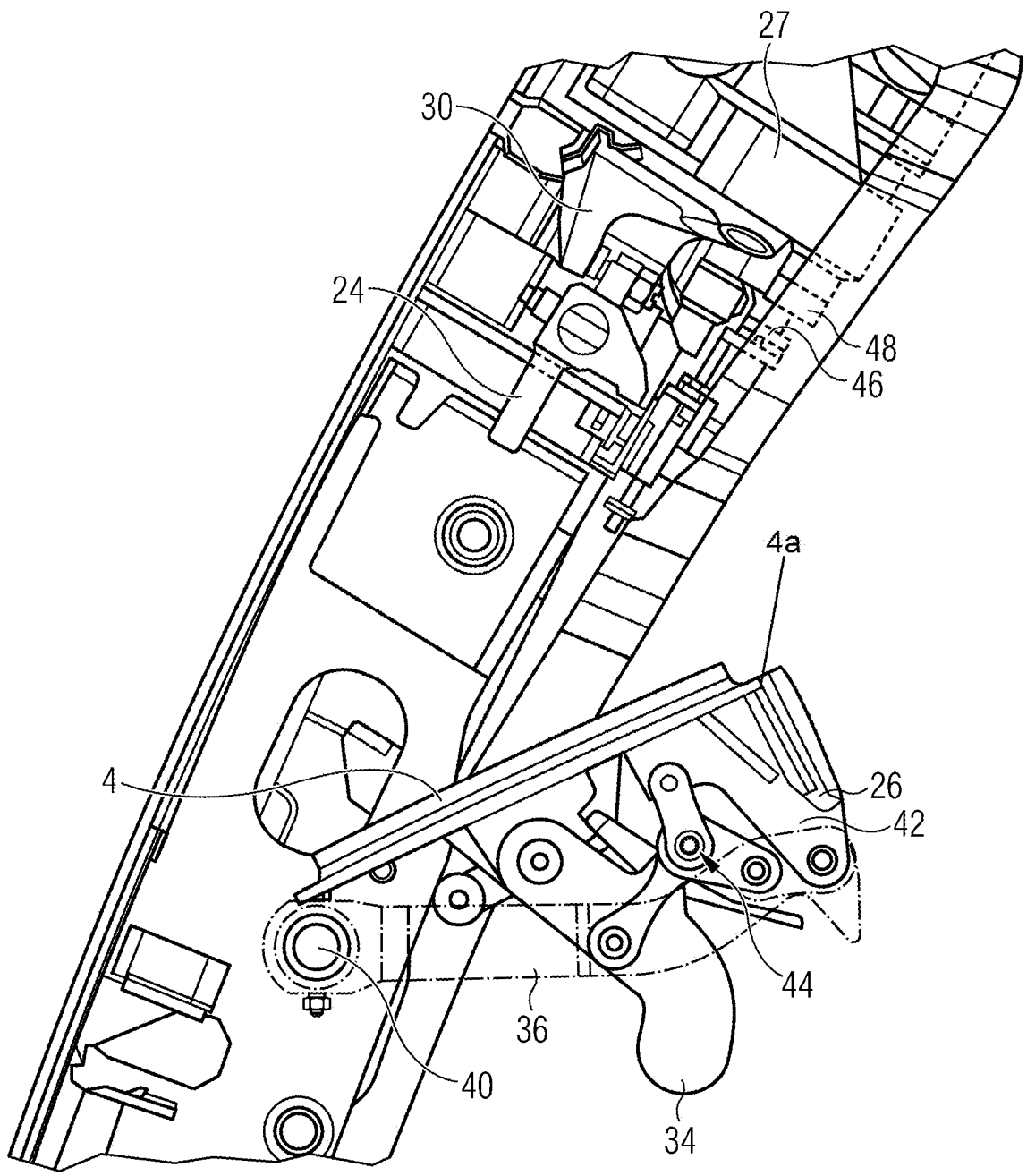
FIG. 5*a*-5*c* show the cut-out of the door system in a third state.
Figure 5B:
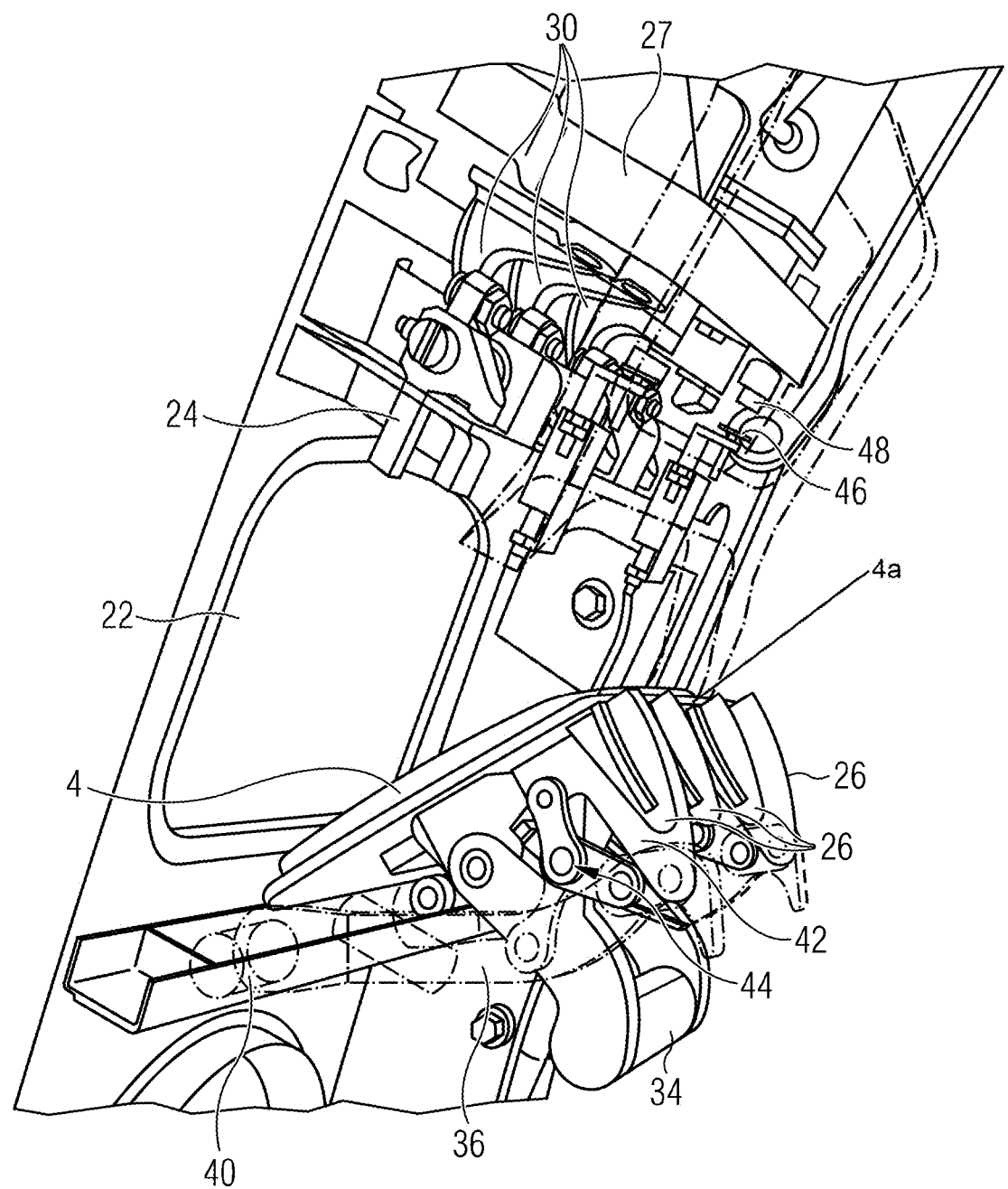
Figure 5C:
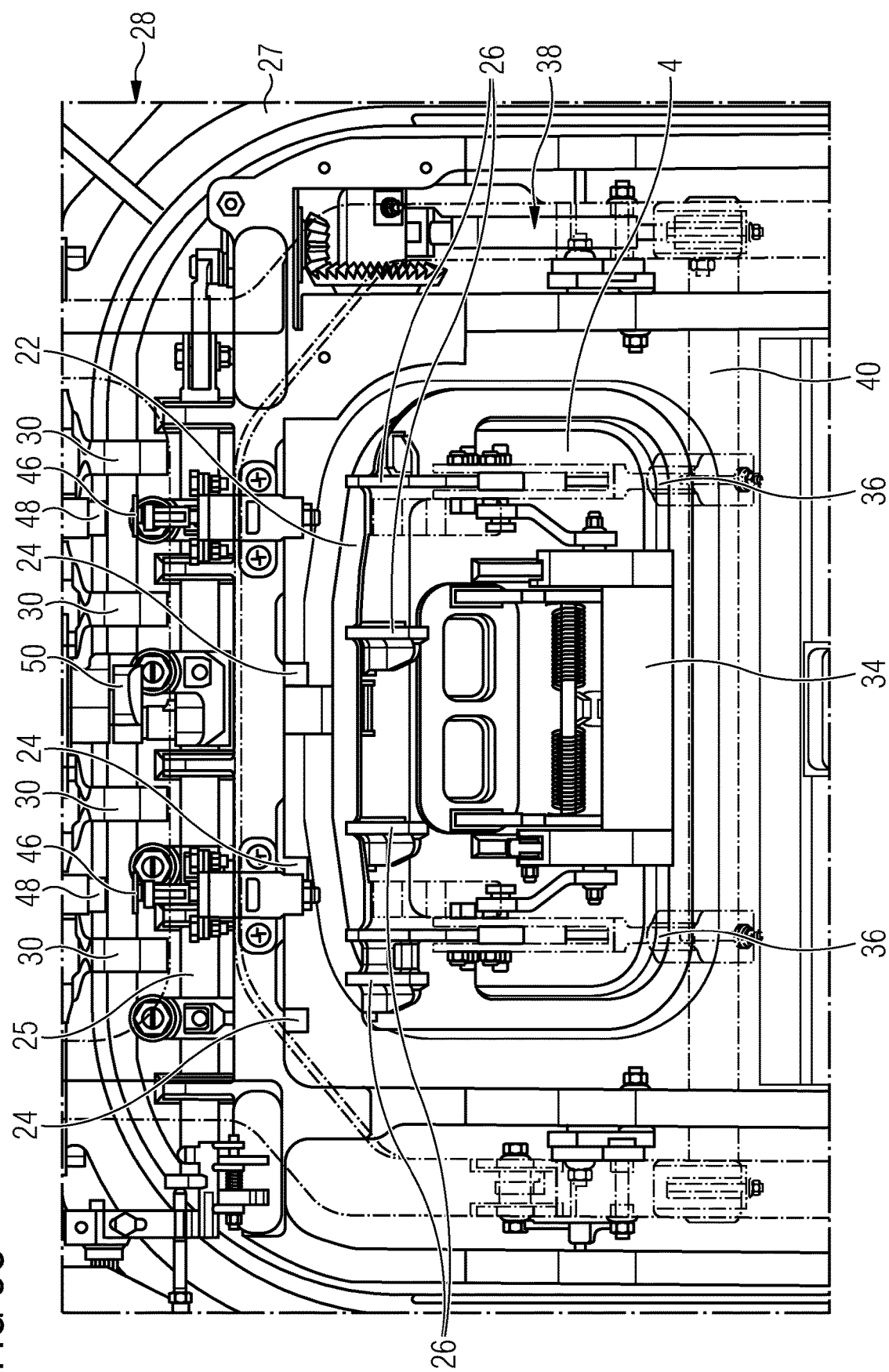

FIGS. 5a-5c show the cut-out of the door system 200 in a third state. In the third state of the door system 200, the pressure compensation flap 4 is in an open position and the locking element 24 is in an unlocking state. In other words, the door 2 is unlocked in this state and can be opened as shown in FIG. 2.

The door unit 100 comprises an actuation mechanism 38 which is configured, during a movement of the pressure compensation flap 4 from the pressure compensation position into the open position, to move the locking element 24 from the locking state into the unlocking state. The actuation mechanism 38 is connected to the at least one arm 36 which is moved during a movement of the pressure compensation flap. The actuation mechanism 38 may comprise a shaft 40 which is connected to the at least one arm 36 and during a movement of the arm 36 is rotated by the arm 36. The shaft may be connected to a translation mechanism which is arranged laterally beside the pressure compensation opening 22 on the door 2. The translation mechanism may be configured to convert a rotational movement of the shaft into a translation of the locking element 24.

In comparison with the pressure compensation position, the pressure compensation flap 4 in the open position is still located further in the direction of the vehicle interior 18. In particular, the pressure compensation flap 4 is rotated from the pressure compensation position into the open position. This is clear from a comparison of FIGS. 3a, 4a and 5a. Firstly, the pressure compensation flap 4 is displaced by activating the handle 34 in the direction of the vehicle interior 18 in order to be moved from the sealing position into the pressure compensation position. Subsequently, the pressure compensation flap 4 is rotated or folded open by further activation of the handle 34 in the direction of the vehicle interior 18 in order to be moved from the pressure compensation position into the open position. In order to ensure this type of movement of the pressure compensation flap 4, the pressure compensation flap 4 may comprise a securing portion 42 which protrudes at the upper end of the pressure compensation flap 4 in the direction of the vehicle interior 18 and which is movably secured to the arm 36. The arm 36 may, in turn, be securely connected to the shaft 40. The shaft 40 may be arranged on the door 2 so as to be translationally secure. The door unit 100 may also comprise a scissor joint system 42 which during the actuation of the handle 34 regulates an angle between the pressure compensation flap 4 and the arm 36.

The door unit 100 comprises, for example, exclusively mechanical components, that is to say, no cable-bound or electrical components. In this instance, the door unit 100 comprises a door state indication element 46 which is arranged in such a manner that, in the event of a movement of the pressure compensation flap 4 from the sealing position into the pressure compensation position, it moves away from the upper end of the door 2 or in the direction of the door center. To this end, the door state indication element 46 may be coupled to the handle 34, the arm 36, the pressure compensation flap 4 and/or the actuation mechanism 38. The door system 200 comprises a spacing sensor 48 which is arranged on the door frame 17 and which is configured to measure a spacing between the spacing sensor 48 and the door state indication element 46. The spacing sensor 48 is consequently arranged on the fuselage so that no such spacing sensor has to be incorporated in the door 2.

Additional electrical components may also be arranged on the fuselage or on the door frame 17. For example, the door system 200 comprises an electrically operated safety actuator 50 ("Flight Lock Actuator"), which is arranged on the door frame and which is configured, in an activated state, to block a movement of the locking element 24 from the locking state into the unlocking state and, in a deactivated state, to release the movement of the locking element 24 from the locking state into the unlocking state.

Figure 6:
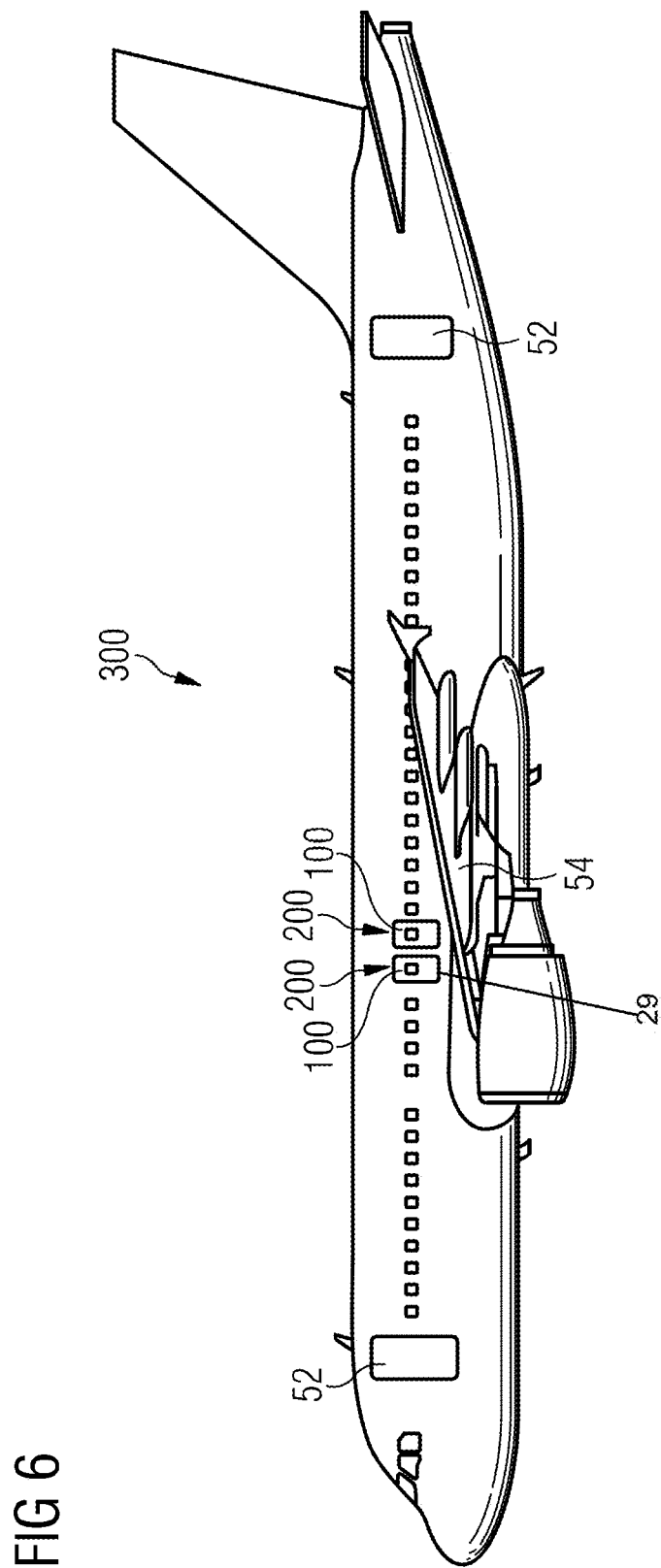
FIG. 6 shows a vehicle having the door unit or the door system.

FIG. 6 shows a vehicle 300 having the door unit 100 or the door system 200. The vehicle 300 from FIG. 6 is an aircraft. The aircraft is configured to transport passengers and/or freight. It has entrance doors 52 in a front region and in a rear region. Two door systems 200 are provided above the wings 54 in this instance. They are used in the variant illustrated as an emergency exit.

Of course, modifications of the aspects and embodiments described herein are possible. For example, the locking element 24 could be configured in such a manner that it has to be rotated from the locking state into the unlocking state. The translation mechanism could be adapted accordingly. The movement sequence of the pressure compensation flap 4 may also be configured differently, for example, the pressure compensation flap 4 could be tilted from the sealing position into the pressure compensation position.

The pressure compensation flap 4 may according to the present disclosure perform a dual function by being used, on the one hand, for the sealing or opening of the pressure compensation opening 22 and, on the other hand, ensuring the locking of the door 2. As a result of the arrangement of the blocking element 26 on the pressure compensation flap 4, in comparison with existing solutions weight and production costs of the door 2 can be saved. An arrangement of electrical components on the fuselage, such as, for example, the spacing sensor 48 and the safety actuator 50, also reduces weight and production costs of the door 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A door unit for a vehicle, comprising:
   a door configured, in a closed position, to cover an opening in the vehicle and to delimit a vehicle interior from a vehicle environment;
   a pressure compensation flap configured, in a sealing position, to cover a pressure compensation opening in the door and, in a pressure compensation position, to at least partially release the pressure compensation opening;
   a locking element configured, in a locking state, to lock the door in the closed position and, in an unlocking state, to unlock the door; and
   a blocking element which directly contacts the pressure compensation flap, and which is configured, in the sealing position of the pressure compensation flap, to block a movement of the locking element from the locking state into the unlocking state, such that the blocking element protrudes from the pressure compensation flap in a direction of the vehicle interior with respect to the pressure compensation flap,
   wherein the blocking element is arranged on the pressure compensation flap, and
   wherein the pressure compensation flap is displaced by means of a translational movement of the pressure compensation flap in a direction of the vehicle interior from the sealing position into the pressure compensation position which clears the pressure compensation opening.

2. The door unit as claimed in claim 1, wherein the blocking element is arranged so as to be at least one of rotationally secure or translationally secure relative to the pressure compensation flap.

3. The door unit as claimed in claim 2, wherein the blocking element is produced integrally with the pressure compensation flap or a carrier element of the pressure compensation flap.

4. The door unit as claimed in claim 1, wherein the blocking element is configured, in the sealing position of the pressure compensation flap, to block a translation of the locking element from the locking state into the unlocking state.

5. The door unit as claimed in claim 4, wherein the blocking element is configured, in the sealing position of the pressure compensation flap, to block the translation of the locking element in a direction which extends substantially parallel with the pressure compensation flap.

6. The door unit as claimed in claim 1, wherein the blocking element protrudes at least partially over an outer edge of the pressure compensation flap.

7. The door unit as claimed in claim 1, wherein the blocking element is configured, in the pressure compensation position of the pressure compensation flap, to permit the movement of the locking element from the locking state into the unlocking state.

8. The door unit as claimed in claim 7, wherein the blocking element is configured in such a manner that, in the pressure compensation position of the pressure compensation flap, the pressure compensation flap is spaced apart from the locking element in a direction of at least one of the vehicle interior or a door center.

9. The door unit as claimed in claim 1, further comprising an actuation mechanism configured, during a movement of the pressure compensation flap from the pressure compensation position into an open position, to move the locking element from the locking state into the unlocking state.

10. The door unit as claimed in claim 1, further comprising a door state indication element arranged such that, during a movement of the pressure compensation flap from the sealing position into the pressure compensation position, the pressure compensation flap moves in a direction of a door center.

11. A door system, comprising:
the door unit as claimed in claim 1;
a door frame having a door lintel and a door threshold; and
a locking counter-piece arranged on the door lintel and configured, in the closed position of the door, in the locking state of the locking element, to cooperate with the locking element to lock the door.

12. The door system as claimed in claim 11, further comprising
a door state indication element arranged such that, during a movement of the pressure compensation flap from the sealing position into the pressure compensation position, the pressure compensation flap moves in a direction of a door center, and
a spacing sensor arranged on the door frame and configured to measure a spacing between the spacing sensor and the door state indication element.

13. The door system as claimed in claim 11, further comprising
a door state indication element arranged such that, during a movement of the pressure compensation flap from the sealing position into the pressure compensation position, the pressure compensation flap moves in a direction of a door center, and
an electrically operated safety actuator arranged on the door frame and configured, in an activated state, to block a movement of the locking element from the locking state into the unlocking state and, in a deactivated state, to release the movement of the locking element from the locking state into the unlocking state.

14. A vehicle comprising the door unit as claimed in claim 1.

15. The vehicle as claimed in claim 14, wherein the vehicle comprises an aircraft.

16. A vehicle comprising the door system as claimed in claim 11.

17. The vehicle as claimed in claim 16, wherein the vehicle comprises an aircraft.

18. The door unit as claimed in claim 1, wherein the pressure compensation flap is displaced by activating a handle which is secured to the pressure compensation flap in the direction of the vehicle interior in order to move the pressure compensation flap from the sealing position into the pressure compensation position.

19. The door unit as claimed in claim 1, wherein the blocking element is arranged in an upper region of the pressure compensation flap.

20. A door system, comprising:
a door unit, comprising:
a door configured, in a closed position, to cover an opening in the vehicle and to delimit a vehicle interior from a vehicle environment;
a pressure compensation flap configured, in a sealing position, to cover a pressure compensation opening in the door and, in a pressure compensation position, to at least partially release the pressure compensation opening;
a locking element configured, in a locking state, to lock the door in the closed position and, in an unlocking state, to unlock the door; and
a blocking element which directly contacts the pressure compensation flap, and which is configured, in the sealing position of the pressure compensation flap, to block a movement of the locking element from the locking state into the unlocking state, such that the blocking element protrudes from the pressure compensation flap in a direction of the vehicle interior with respect to the pressure compensation flap,
wherein the blocking element is arranged on the pressure compensation flap;
a door frame having a door lintel and a door threshold; and
a locking counter-piece arranged on the door lintel and configured, in the closed position of the door, in the locking state of the locking element, to cooperate with the locking element to lock the door.

* * * * *